Nov. 10, 1942.    H. D. MINICH    2,301,222
THERMO-STRETCHABLE FILM
Filed Aug. 3, 1940
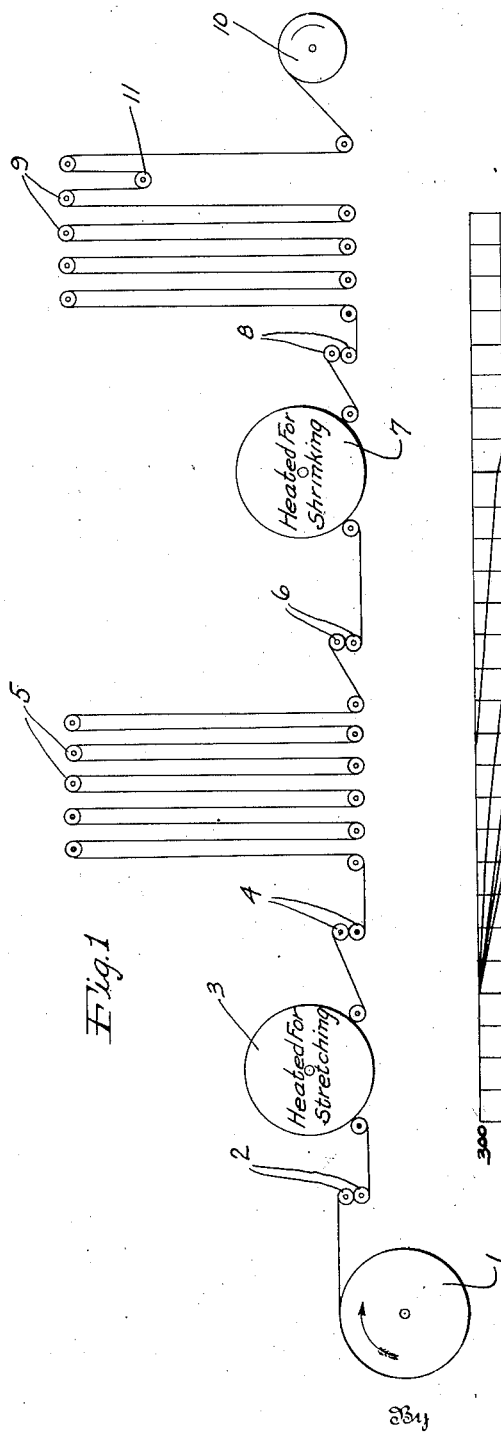
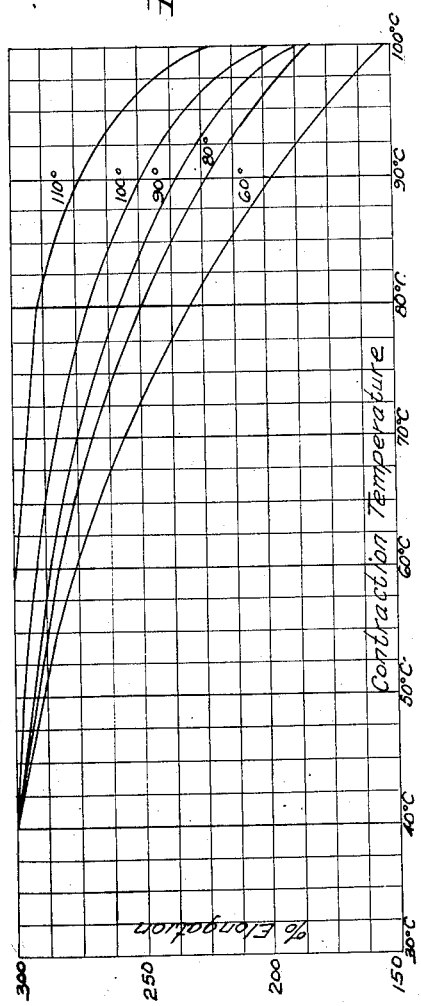
Inventor
Henry D. Minich
By
P. W. Waters
Attorney Patented Nov. 10, 1942

2,301,222

UNITED STATES PATENT OFFICE 2,301,222

THERMOSTRETCHABLE FILM

Henry D. Minich, Tarrytown, N. Y.

Application August 3, 1940, Serial No. 350,624

2 Claims. (Cl. 18—57)

This invention relates to a thermo-stretchable, thermo-elastic film. The invention includes both the method of treatment and the resulting product. By "thermo-stretchable" is meant a film which may be stretched when heated. By "thermo-elastic" is meant the property of tending to return partially or completely to its original unstretched condition when the stretching tension is released at or below the stretching temperature.

The process of the invention is applicable to thermo-stretchable, thermo-elastic films which on heating can be stretched with no more than partial plastic flow and which have sufficient internal viscosity at room temperature to prevent the stretched film from returning to its original unstretched condition at room temperature. According to this invention, a film of such material which has been heated and stretched is thereafter heated under such conditions as to allow free contraction to a temperature at which it loses part but not all of its original stretch. The properties of such a film are different from the properties of unstretched film and also from film which has been stretched without subsequently being heated to cause any retraction or loss of its original stretch. This will be evident from what follows. The invention applies, for example, to films of rubber hydrochloride, polyvinyl derivatives, polystyrol derivatives, etc., which may be plasticized as necessary or desired. It is more generally applicable to materials composed of long chain molecules or molecular aggregates. The invention will be discussed more particularly as it pertains to films of rubber hydrochloride.

The rubber hydrochloride film may be produced as described in Calvert 1,989,632. Such film is now available on the market. When heated this film can be stretched. For example, on heating to a temperature of 100° C., the film may be stretched to several hundred percent of its original area. This stretching may be produced by increasing a single dimension of the film or by increasing both dimensions. For the purpose of discussion, it is easier to consider such film which has been stretched along only one axis.

Let us consider, for example, rubber hydrochloride film which has been heated to 100° C. and stretched to four hundred per cent of its original length. Such film may contain a plasticizer or it may be unplasticized. It may be colored with dyes or pigments. It may or may not contain a stabilizer as described in the aforesaid Calvert patent. The film heated and stretched to this extent will be maintained under tension until it has been cooled to room temperature. When the tension is released, the film will retract to some extent but will retain most of its original stretch. This stretched film has properties quite different from the properties of unstretched film. For example, its tensile strength is increased in the direction in which it has been stretched. On heating to about 130° C., or somewhat less, the film will shrink to its original unstretched condition.

The amount to which the stretched film will retract on subsequent heating depends upon the temperature to which it is heated. If heated to 50° C., it will not retract to as great an extent as if it is heated to 70° C. If heated to 70° C., it will not retract to as great an extent as if it is heated to 90° C. The internal viscosity of the film composition prevents the film from retracting to its original unstretched condition. By heating, the internal viscosity is reduced. The higher the temperature to which the film is heated, the less the internal viscosity and the greater the retraction. By heating stretched rubber hydrochloride film to 130° C., or somewhat less, it loses all its stretch.

What has been said above with regard to rubber hydrochloride film does not apply to film which on stretching exhibits only plastic flow. When such a film is stretched, its tensile strength is not markedly increased. There is no appreciable residual elasticity tending to cause contraction in material which can be so stretched with only plastic flow. The materials to which the present invention is applicable may exhibit plastic flow to a certain extent, but wherever the invention is applicable the film is stretched with no more than partial plastic flow, i. e., if there is some plastic flow, there is also some stretching without plastic flow.

Films which have been stretched according to this invention have properties different from unstretched film and properties different from film which has been stretched without subsequent retraction. For example, rubber hydrochloride film which has been heated and stretched and then allowed to cool at room temperature and is thereafter heated to a lower temperature X without tension so that it retracts, has properties different from those it possessed before being heated to X temperature. For example, film which has been stretched and cooled to room temperature under tension and is not thereafter heated will shrink if heated to any temperature, even a temperature below X, but film which has been treated according to this invention, by first stretching and cooling to room temperature under tension and thereafter heating to the temperature X at which it is allowed to retract a certain amount, can thereafter be used or treated at temperatures up to the temperature X without retracting. Such film must be heated to a temperature higher than X in order to cause it to retract further. For example, rubber hydrochloride film or film of other material which can be treated according to this invention, which film has been heated and stretched will shrink when placed in boiling water. However, film which has been heated and stretched and thereafter relieved from all tension while heated to 100° C., can thereafter be subjected to boiling water without retraction. Film thus treated can be sterilized whereas the untreated stretched film will shrink badly if subjected to sterilization temperature.

The invention is applicable to a single ply of film and to multi-ply film made by laminating two or more plies which have been heated without tension, either individually before lamination or collectively after lamination.

The invention is further described in connection with the accompanying drawing in which Fig. 1 shows diagrammatically apparatus for carrying out the invention, and Fig. 2 is a graph representing graphically the properties of films stretched according to this invention.

Rubber hydrochloride film from the roll 1 is passed between the pinch rolls 2 which control the speed at which the film passes over the heated drum 3. From this heated roll the film passes through the pull rolls 4 which are driven at a speed at least twice as great as the speed of the rolls 2 and stretch the heated film as it leaves the drum 3. This stretched film, if cooled under tension, will retain most of its stretch although it will contract somewhat. For example, rubber hydrochloride film which is stretched to five times its original length and then cooled to room temperature will on standing contract or retract to only somewhere between 4 and 5 times its original length. To permit such contraction on the film from the rolls 4 is passed over a long festoon 5 on which the film is allowed to cool. The retraction may occur on the festoon or after the film passes through the pinch rolls 6, depending upon the length of the festoon and the speed of the rolls 6, etc. As the speed of the rolls 8 is less than the speed of the rolls 6, if the speed of the rolls 6 is the same as the speed of the rolls 4 the retraction will take place after the film passes through the rolls 6. After such retraction the film will retain its length indefinitely if maintained at room temperature.

The film now passes over the hot roll 7. Here it is again heated. As shown in the drawing, the film is kept in contact with the roll 7 for some little distance to insure thorough and uniform heating. It is pulled over the roll 7 by the rolls 8, which travel at a lower speed than the rolls 6. In this way the film has been controllably shrunk. The temperature of the roll 7 determines the internal viscosity of the film composition and the extent to which the film will shrink. If the rolls 8 are driven too fast the film will shrink or retract some after passing through these rolls.

After passing through the rolls 8 the film passes over another festoon 9 and thence to the wind-up roll 10. In the festoon, or somewhere between the rolls 8 and the wind-up, it is desirable to provide the usual floating roll 11 to take up any slack and allow for any additional shrinkage of the film.

Laminated film may be similarly treated. For example, instead of a single ply, several plies of cast rubber hydrochloride film, for example, three or four or six, or more, plies are brought between the pinch rolls 2 and then passed over the heated roll 3. An additional roll or two to press the plies of film together as they pass over the roll 3 may be required to insure coalescence of the plies on the roll 3. The plies are preferably brought to the roll in such a way that there is no entrapped air between the plies. The heated film is then drawn from the roll 3 at a higher speed than the surface speed of the roll. For example, the film may be drawn from the roll at a speed five times the speed of the roll. The film is cooled under tension and if the laminated film is sufficiently thick it may be necessary to provide cooling equipment between the hot roll 3 and the pull rolls 4. The laminated film after stretching and cooling on the festoon 5 is then again heated on the roll 7 and allowed to retract somewhat, just like the single ply film.

Although the drawing shows a preferred apparatus, the festoon 5 and rolls 6 may be omitted if the single ply film is allowed to cool sufficiently between the heated rolls 3 and 7. The steps of the process then include heating and stretching with subsequent heating and contraction.

The effect of heat on a stretched rubber hydrochloride film is illustrated in Fig. 2. Although Fig. 2 is based on results obtained by the treatment of a rubber hydrochloride film plasticized to increase its tear resistance, an unplasticized film behaves similarly. Each curve of Fig. 2 represents the reaction of a film stretched at a different temperature. The various curves represent the reactions of films stretched at 60° C., 80° C., 90° C., 100° C. and 110° C., respectively.

All films were initially stretched so that at room temperature they possessed an elongation of 300%, i. e., they were four times as long after stretching as before. As the stretched films retract somewhat when the stretching tension is released at room temperature, it was necessary to stretch each of the films somewhat over 300%, so that after cooling it would retain a 300% stretch. For example, the film stretched at 60° C. was stretched about 450%, and on relieving the tension at room temperature it retracted to 300%. The film stretched at 110° C. was stretched only about 350%, and on relieving the tension at room temperature retracted only enough to give an elongation of 300%. The films stretched at intermediate temperatures were originally stretched between these limits of 450% and 350% to give a residual elongation of 300%.

The different films were then raised to various elevated temperatures and the amounts of contraction or retraction noted. By referring to Fig. 2 it will be seen that as one increases the temperature to which the film is heated without tension (called on the drawing "Contraction temperature") the percent elongation as indicated at the side of the drawing decreases: in other words the greater the contraction or retraction of the film. Furthermore, it is noted that regardless of the temperature to which the films are heated, the contraction of any film stretched at a higher temperature is less than that of any film stretched at a lower temperature.

It is interesting to note that a film does not contract to its original dimensions even though heated to a temperature somewhat above the temperature at which it was stretched. However, it is quite probable that all films retract to their original dimensions if heated to the melting point of the film, that is the temperature at which the crystalline structure disappears when the films are examined under the X-ray.

Instead of the heating rolls shown in Fig. 1, other means for heating may be employed. For example, the film may be heated by hot water or hot air or steam, etc. Any suitable means for heating and stretching and otherwise handling the film may be utilized. Although the invention is more particularly described in connection with longitudinal stretching, it applies equally to film stretched widthwise and also to film stretched both widthwise and lengthwise. It includes also the treatment of laminated film one or more plies of which are stretched longitudinally or widthwise.

I claim:

1. Stretched rubber hydrochloride film which will shrink when heated to the temperature at which the crystalline structure disappears when examined under the X-ray but which on heating to a lower temperature above 70° C. will not shrink.

2. Stretched rubber hydrochloride film which on heating to about 100° C. will not shrink.

HENRY D. MINICH.